(12) United States Patent
Bechtel et al.

(10) Patent No.: US 12,637,151 B2
(45) Date of Patent: May 26, 2026

(54) AIR DOOR ADJUSTABLE AIR DEFLECTOR FOR OPEN AIR DRIVING APPLICATIONS

(71) Applicant: FCA US LLC, Auburn Hills, MI (US)

(72) Inventors: Travis D Bechtel, Goodrich, MI (US); Richard T Stuedemann, Ortonville, MI (US); Brandon Brady, Lapeer, MI (US)

(73) Assignee: FCA US LLC, Auburn Hills, MI (US)

( * ) Notice: Subject to any disclaimer, the term of this patent is extended or adjusted under 35 U.S.C. 154(b) by 362 days.

(21) Appl. No.: 18/360,438

(22) Filed: Jul. 27, 2023

(65) Prior Publication Data

US 2025/0033715 A1 Jan. 30, 2025

(51) Int. Cl.
B62D 35/00 (2006.01)

(52) U.S. Cl.
CPC .................................. B62D 35/008 (2013.01)

(58) Field of Classification Search
CPC ....................................................... B62D 35/008
See application file for complete search history.

(56) References Cited

U.S. PATENT DOCUMENTS

| | | | | |
|---|---|---|---|---|
| 2,465,345 A | * | 3/1949 | Elsebusch | B60J 1/20 |
| | | | | D12/181 |
| 2,608,926 A | * | 9/1952 | Helsley | B60J 1/20 |
| | | | | 296/85 |
| 2,841,440 A | * | 7/1958 | Werner | B60J 1/14 |
| | | | | 454/128 |
| 3,667,369 A | | 6/1972 | Smith | |

| | | | | |
|---|---|---|---|---|
| 4,476,774 A | * | 10/1984 | Liberto | B60J 1/20 |
| | | | | 454/135 |
| 5,114,205 A | * | 5/1992 | Jee | B60J 1/2002 |
| | | | | 454/131 |
| 5,702,149 A | * | 12/1997 | Sweeney | B60J 1/2002 |
| | | | | 454/131 |

(Continued)

FOREIGN PATENT DOCUMENTS

WO WO-2005102826 A1 * 11/2005 ............. B62D 37/02

OTHER PUBLICATIONS

Hillbank Motor Corporation—1964 Cobra; https://www.hillbankusa.com/vehicles/461/1964-cobra-289-fia-csx7000; Retrieved from the Internet on Jul. 27, 2023.

(Continued)

*Primary Examiner* — Faye M Fleming
(74) *Attorney, Agent, or Firm* — Jeremy J. Klobucar

(57) ABSTRACT

An air deflector assembly set for mounting relative to a vehicle frame at a vehicle door opening and directing airflow relative to a vehicle cabin is provided. The air deflector assembly set includes a first air deflector assembly that includes a first air deflector frame and a first air deflector body supported by the first air deflector frame. The first air deflector body having an air deflecting surface that extends between a forward edge, a rearward edge, a bottom edge and a top edge. The first air deflector assembly is pivotally coupled to the vehicle frame and selectively rotatable between a closed position and an open position. In the closed position, airflow is deflected to a first rearward location. In the open position, airflow is deflected to a second rearward location, the second rearward location being further back into the vehicle cabin compared to the first rearward location.

18 Claims, 6 Drawing Sheets

(56) References Cited

U.S. PATENT DOCUMENTS

| | | | | |
|---|---|---|---|---|
| 8,226,152 B2 * | 7/2012 | Calco | .......................... | B60J 1/20 |
| | | | | 296/180.1 |
| 10,065,482 B1 * | 9/2018 | Gur | ......................... | B60J 1/2002 |
| 11,286,011 B2 * | 3/2022 | McAfee | ................... | B60J 10/72 |
| 2010/0109377 A1 * | 5/2010 | Calco | .......................... | B60J 1/20 |
| | | | | 296/180.1 |

OTHER PUBLICATIONS

Jeep Wind Deflector—https://wadeauto.com/products/jeep-wrangler-jk-top-wind-deflector; Retrieved from the Internet on Jul. 27, 2023.
STOL CH 750 Airplane Air Deflectors—https://youtu.be/cfQM3jz1kh4?t=234; Retrieved from the Internet on Jul. 27, 2023.
Vent Window—https://www.corvsport.com/this-1967-chevrolet-corvette-convertible-327-is-yours-to-take/; Retrieved from the Internet on Jul. 27, 2023.

* cited by examiner

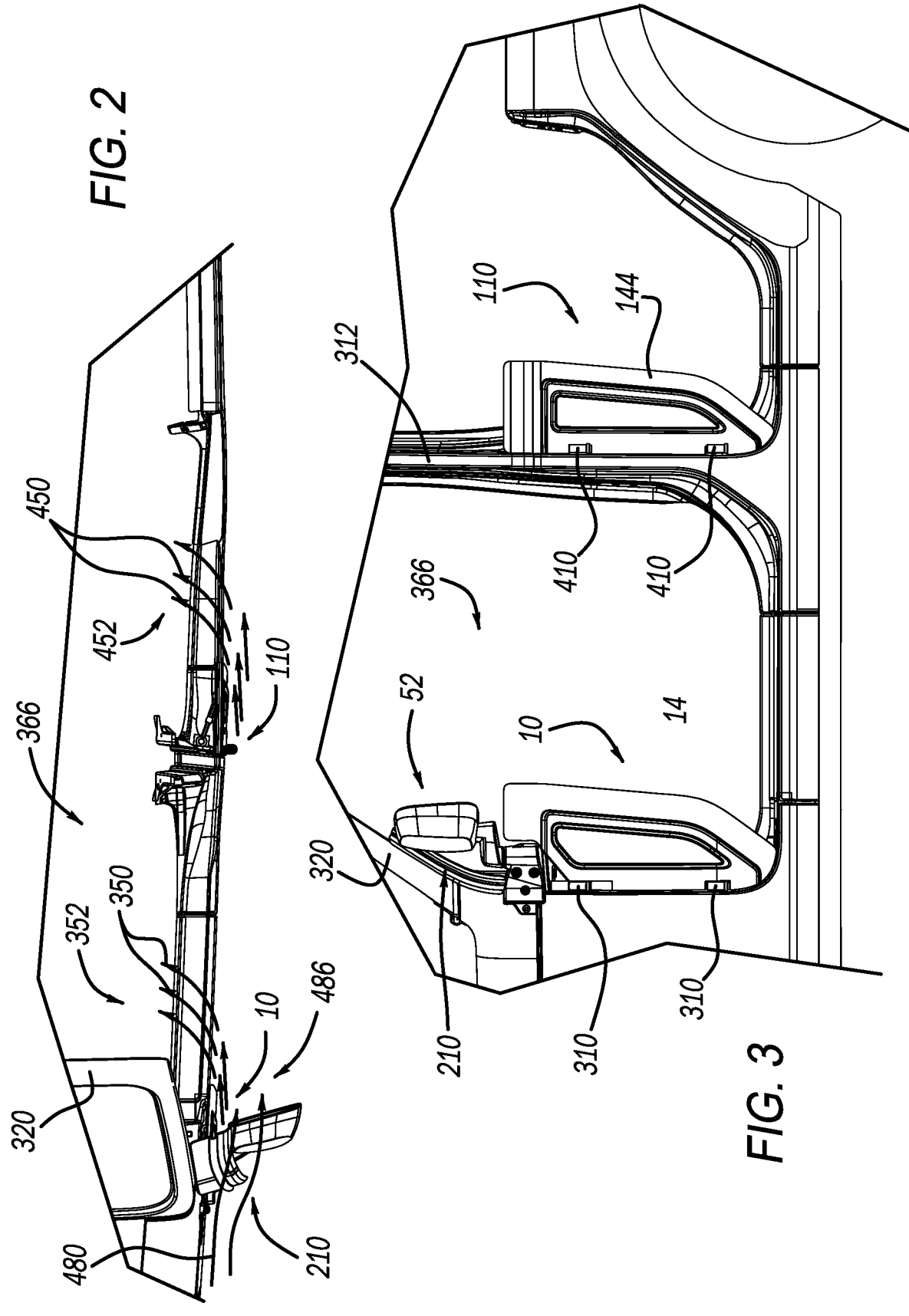

AIR DOOR ADJUSTABLE AIR DEFLECTOR FOR OPEN AIR DRIVING APPLICATIONS

FIELD

The present application generally relates to open air vehicles and, more particularly, to an adjustable air deflector that redirects airflow away from vehicle occupants.

BACKGROUND

Some vehicles are designed to be operated in an open air configuration with the doors removed. For example, some off-road vehicles are specifically designed such that a user can easily remove some or all of the doors for driving with an enhanced open air experience. In many instances, it can be challenging to manage the thermal comfort of the vehicle occupants when the doors are removed as the airflow passed through the vehicle cabin can be significant at higher speeds. In this regard, while driving a vehicle with the doors removed enhances the open air experience, there exists an opportunity for improvement in the relevant art.

SUMMARY

According to one example aspect of the invention, an air deflector assembly set for mounting relative to a vehicle frame at a vehicle door opening and directing airflow relative to a vehicle cabin is provided. The air deflector assembly set includes a first air deflector assembly that includes a first air deflector frame and a first air deflector body supported by the first air deflector frame. The first air deflector body having an air deflecting surface that extends between a forward edge, a rearward edge, a bottom edge and a top edge. The first air deflector assembly is pivotally coupled to the vehicle frame and selectively rotatable between a closed position and an open position. In the closed position, airflow is deflected by the first air deflector body to a first rearward location. In the open position, airflow is deflected by the first air deflector body to a second rearward location, the second rearward location being further back into the vehicle cabin compared to the first rearward location.

In some implementations, the first air deflector assembly is mounted relative to front hinge knuckles extending from the vehicle frame at a front door opening. The first air deflector frame further includes eyelets that receive front hinge pins. The front hinge pins extend into the knuckles and define an axis of rotation of the first air deflector between the closed and open positions.

In some implementations, the first air deflector assembly further includes a first support arm that extends between a frame post and a first mounting bracket. The first mounting bracket is configured to be fixedly mounted to the frame of the vehicle.

In some examples, the first air deflector body is formed of transparent material. The air deflector body defines a notch at the top edge configured to accommodate a mirror assembly of the vehicle. The first air deflector frame further comprises a forward frame member, a rearward frame member, a bottom frame member and a top frame member. The rearward frame member is stepped away from the rearward edge of the first air deflector body toward the forward frame member.

According to another example aspect of the invention, the air deflector assembly set further includes a second air deflector assembly mounted relative to rear hinge knuckles extending from the vehicle frame. The second air deflector assembly comprises a second air deflector frame and a second air deflector body supported by the second air deflector frame. The second air deflector body has an air deflecting surface that extends between a forward edge, a rearward edge, a bottom edge and a top edge. The second air deflector assembly is pivotally coupled to the vehicle frame and selectively rotatable between a closed position and an open position. In the closed position, airflow is deflected by the second air deflector body to a third rearward location. In the open position, airflow is deflected by the second air deflector body to a fourth rearward location, the fourth rearward location being further back into vehicle cabin compared to the third rearward location.

In some implementations, the second air deflector frame further includes eyelets that receive rear hinge pins, the rear hinge pins extending into the rear hinge knuckles and defining an axis of rotation of the second air deflector between the closed and open positions.

In some implementations, the second air deflector assembly further includes a second support arm that extends between a frame post and a second mounting bracket, the second mounting bracket configured to be fixedly mounted to the frame of the vehicle. The second air deflector body is formed of transparent material. The second air deflector frame further comprises a forward frame member, a rearward frame member, a bottom frame member and a top frame member. The rearward frame member is stepped away from the rearward edge of the second air deflector body toward the forward frame member.

According to another example aspect of the invention, the air deflector assembly further includes a third air deflector assembly configured for mounting relative to a mirror assembly of the vehicle. The third air deflector assembly includes a third air deflector frame, a hinge post and a third air deflector body. The hinge post defines an axis substantially parallel to a floor of the vehicle. The third air deflector frame is mounted for pivotal movement around the axis. The third air deflector body is supported by the third air deflector frame, the third deflector body rotatable with the third air deflector frame between a closed position and an open position.

In other implementations, in the closed position, airflow is deflected by the third air deflector body to a fifth rearward location and in the open position, airflow is deflected by the third air deflector body to a sixth rearward location, the sixth rearward location allowing airflow to move between the mirror assembly and frame of the vehicle. The third air deflector body is formed of transparent material.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

FIG. 2 is a top view of the first, second and third air deflector assemblies of FIG. 1 shown installed and in the closed position;

FIG. 3 is a side view of the open air vehicle of FIG. 1 shown installed and in the closed position;

DESCRIPTION

As discussed above, some vehicles are designed for operation with the doors removed. In some instances, it can be difficult to manage the thermal comfort of the vehicle occupants when the doors are removed as the airflow passed through the vehicle cabin is significant. Example vehicles designed for open air driving while the vehicle doors are off include a Jeep® Wrangler and a Jeep® Gladiator. The following examples described herein provide air deflector assemblies installed onto a 4-door Jeep® Wrangler. It will be appreciated however that the air deflector assemblies described herein may be installed onto other vehicle configurations while reaching similar results. Moreover, while the air deflector assemblies described herein include a first air deflector assembly for installation relative to a front door location, a second air deflector assembly for installation relative to a rear door location and a third air deflector assembly for installation generally above the first air deflector assembly rear an a-pillar, some or all of the air deflectors may be installed for use on the vehicle depending on user preference.

As will become appreciated, the air deflector assemblies according to the present disclosure improve airflow in the vehicle cabin, when one or more vehicle doors are removed, to improve a customer experience for open-air driving. In particular, the air deflector assemblies can mitigate outside air intrusion into the vehicle cabin from the vehicle door opening(s). In this regard, the operation of the vehicle automatic temperature control, including any heated/cooled seats, heated/cooled steering wheel can be more effective to improve the comfort of the vehicle occupants. The air deflector assemblies each can be further adjusted to further control and redirect the airflow away from entering the vehicle cabin through the door openings.

The following discussion is directed toward installation of air deflector assemblies relative to driver side door openings. It is appreciated however, that air deflector assemblies can be similarly installed for operation relative to passenger side door openings.

Figure 1:
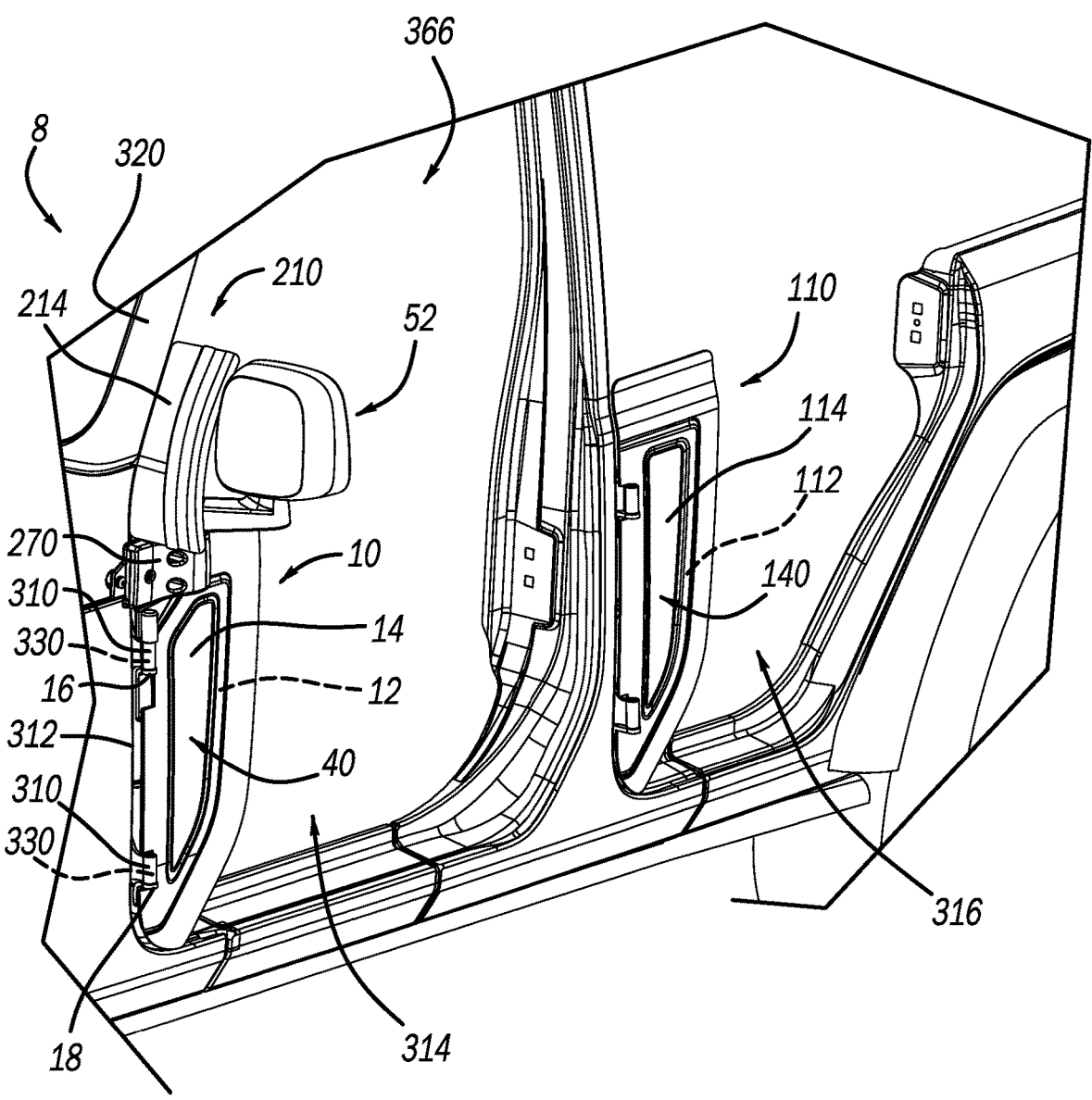
FIG. 1 is a front perspective view of an open air vehicle having first, second and third air deflector assemblies installed and in a closed position according to one example of the present disclosure.
Figures 7, 8, 9:
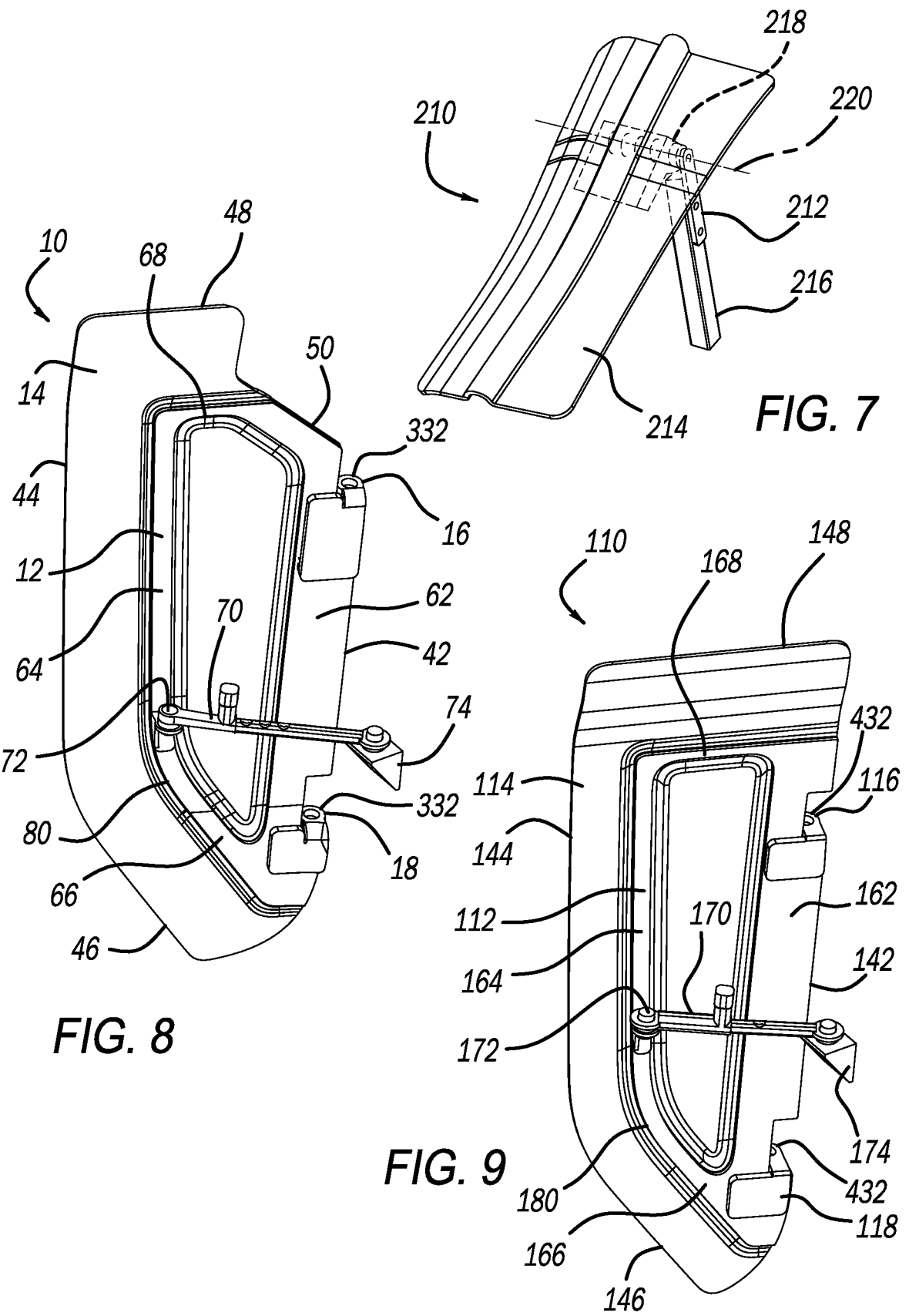
FIG. 7 is a front perspective view of the third air deflector assembly of FIG. 1.
FIG. 8 is a rear view of the first air deflector assembly of FIG. 1.
FIG. 9 is a rear view of the second air deflector assembly of FIG. 1.
Figures 10, 11, 12:
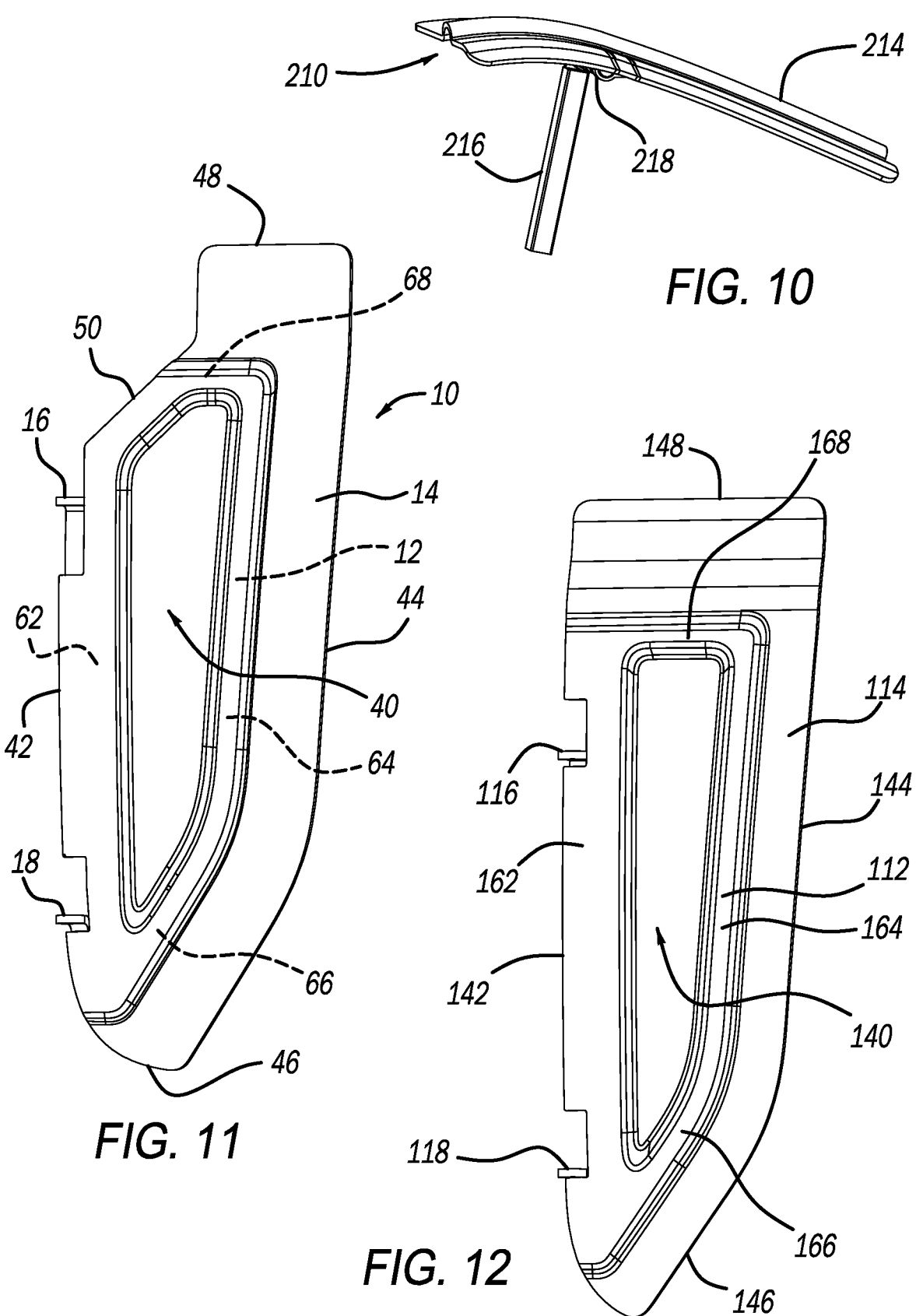
FIG. 10 is a side perspective view of the third air deflector assembly of FIG. 1.
FIG. 11 is a front view of the first air deflector assembly of FIG. 1.
FIG. 12 is a front view of the second air deflector assembly of FIG. 1.

With initial reference to FIGS. 1, 8 and 11, an air deflector assembly set 8 constructed in accordance to examples of the present disclosure includes a first air deflector assembly set 10, a second air deflector assembly set 110 and a third air deflector assembly set 210. The first air deflector assembly 10 includes a first air deflector frame 12, a first air deflector body 14, a first hinge interface member 16 and a second hinge interface member 18. The first air deflector body 14 is made of transparent material such as, but not limited to, plexiglass. The first air deflector body 14 includes an air deflecting surface 40 that extends between a forward edge 42, a rearward edge 44, a bottom edge 46 and a top edge 48. The top edge 48 generally includes a notch 50 to accommodate a mirror assembly 52 as further described below.

The first air deflector frame 12 provides structural support to the first air deflector body 14. The first air deflector frame 12 includes a forward frame member 62, a rearward frame member 64, a bottom frame member 66 and a top frame member 68. In examples, the rearward frame member 64 is stepped away from the rearward edge 44 of the first air deflector body 14 toward the forward frame member 62 to provide enhanced support to the first air deflector body 14 as a whole. A first support arm 70 extends between a frame post 72 configured on the first air deflector frame 12 and a first mounting bracket 74 configured to be fixedly mounted to the frame of the vehicle. In one example, the first air deflector frame 12 can nest in a channel 80 (FIG. 8) defined by the first air deflector body 14.

With further reference now to FIGS. 2, 9 and 12, the second air deflector assembly 110 will be described. The second air deflector assembly 110 includes a second air deflector frame 112, a second air deflector body 114, a first hinge interface member 116 and a second hinge interface member 118. The second air deflector body 114 is made of transparent material such as, but not limited to, plexiglass. The second air deflector body 114 includes an air deflecting surface 140 that extends between a forward edge 142, a rearward edge 144, a bottom edge 146 and a top edge 148.

The second air deflector frame 112 provides structural support to the second air deflector body 114. The second air deflector frame 112 includes a forward frame member 162, a rearward frame member 164, a bottom frame member 166 and a top frame member 168. In examples, the rearward frame member 164 is stepped away from the rearward edge 144 of the second air deflector body 114 toward the forward frame member 162 to provide enhanced support to the second air deflector body 114 as a whole. A second support arm 170 extends between a frame post 172 configured on the second air deflector frame 112 and a second mounting bracket 174 configured to be fixedly mounted to the frame of the vehicle. In one example, the second air deflector frame 112 can nest in a channel 180 (FIG. 9) defined by the second air deflector body 114.

With particular reference now to FIGS. 1, 7 and 10, the third air deflector assembly 210 will be described. The third air deflector assembly 210 includes a third air deflector frame 212, a third air deflector body 214, a mounting stem 216, and a hinge post 218. The hinge post 218 defines an axis 220. In examples, the axis 220 extends substantially parallel to ground or a floor of the cabin 366 of the vehicle 320. The third air deflector frame 212 is mounted for pivotal movement around the axis 220 (FIG. 7) of the hinge post 218. As described below, the mounting stem 216 is configured to mount relative to the mirror assembly 52. The third air deflector body 214 rotates about the axis 220 of the hinge post 218 to adjust airflow near the mirror assembly 52. The third air deflector body 214 is made of transparent material such as, but not limited to, plexiglass.

With reference now to all FIGS, additional features of the first air deflector assembly 10 will be described. The first air deflector assembly 10 is configured to be installed relative to a front door opening 314 of the vehicle 320. The first air deflector assembly 10 includes front hinge knuckles 310 extending from a frame 312 of a vehicle 320. The hinge knuckles 310 are configured to alternatively receive mounting hardware associated with a front door of the vehicle 320. In this regard, once the front door of the vehicle 320 is removed from the hinge knuckles 310, the first air deflector assembly 10 can be mounted onto the front hinge knuckles 310. In examples, front hinge pins 330 can be slidably inserted relative to the hinge knuckles 310 and eyelets 332 (FIG. 8) provided on the first and second hinge interface members 16 and 18. The first mounting bracket 74 is further secured to the frame 312.

Figure 4:
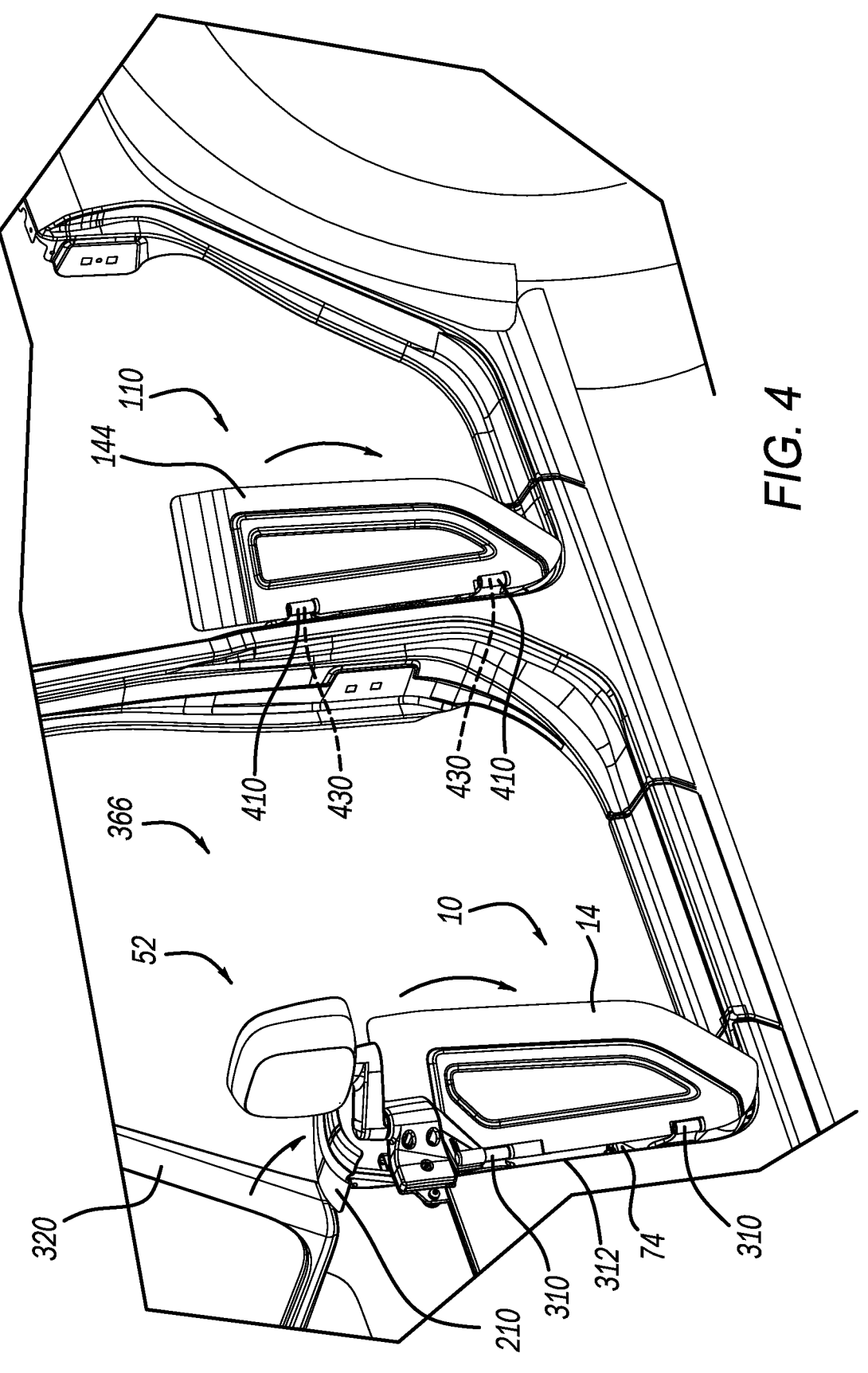
FIG. 4 is a front perspective view of the open air vehicle of FIG. 1 shown with the first, second and third air deflector assemblies installed and in a rotated position
Figures 5, 6:
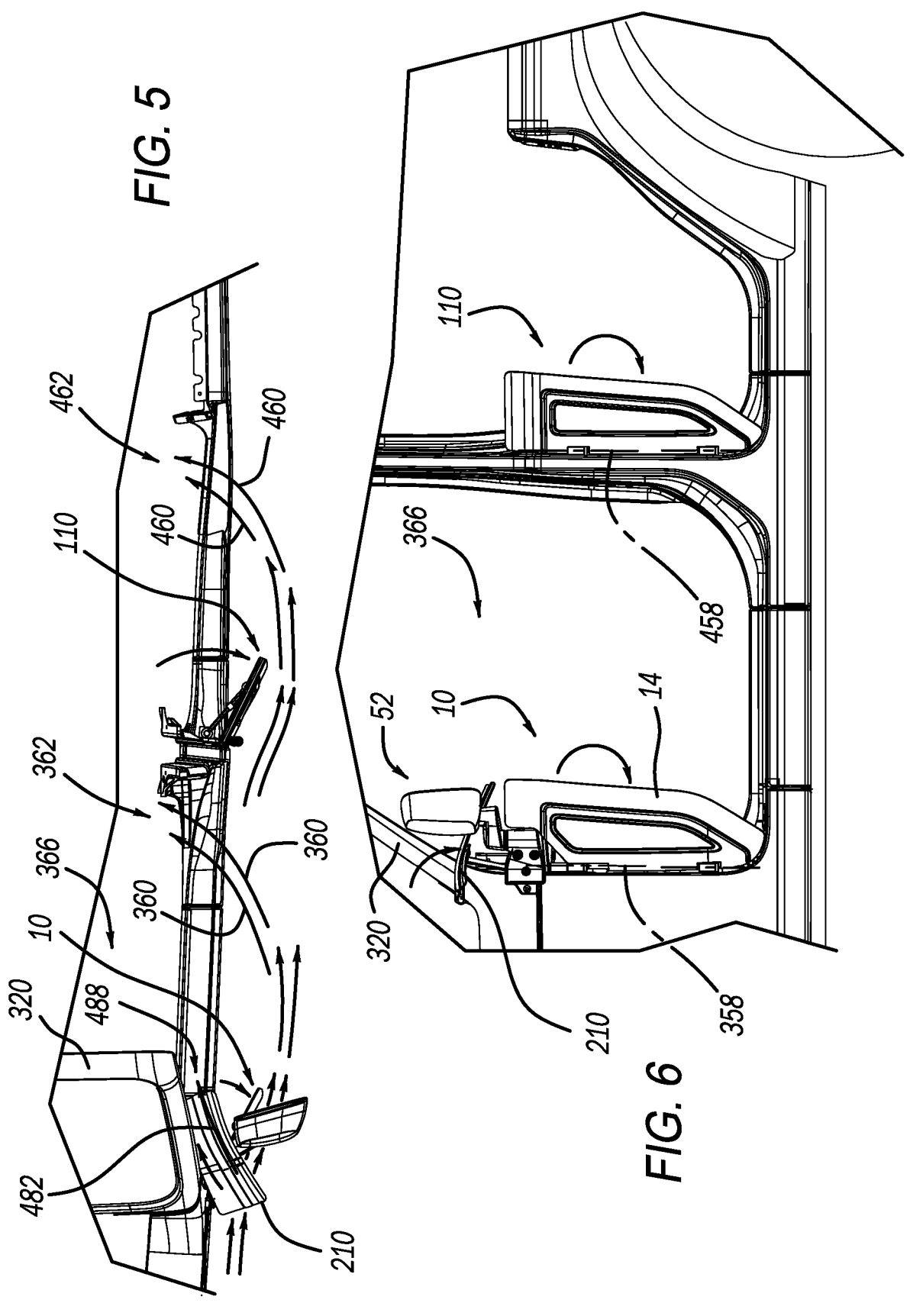
FIG. 5 is a top view of the first, second and third air deflector assemblies of FIG. 1 shown installed and in the rotated position.
FIG. 6 is a side view of the open air vehicle of FIG. 1 shown installed and in the rotated position.

Once the first air deflector assembly 10 is installed, a vehicle operator can rotate the first air deflector assembly 10 generally between a closed position (FIGS. 1-3) and a rotated or fully open position (FIGS. 4-6). It is appreciated that the first air deflector assembly 10 can be rotated to multiple positions between the closed and fully open positions to redirect airflow as desired. In the closed position, airflow 350 (FIG. 2) is generally deflected to a first rearward location 352 as compared to operation of the vehicle 320 without doors. When the first air deflector assembly 10 is rotated about front axis 358 to the fully open position, airflow 360 (FIG. 5) is generally deflected to a second rearward location 362. The second rearward location 362 is further back into a cabin 366 of the vehicle 320 as compared to the first rearward location 352 when the first air deflector assembly 10 is in the closed position.

The second air deflector assembly 110 will be further described. The second air deflector assembly 110 is configured to be installed relative to a rear door opening 316 of the vehicle 320. The second air deflector assembly 110 is configured to be installed relative to rear hinge knuckles 410 extending from the frame 312 of a vehicle 320. The hinge knuckles 410 are configured to alternatively receive mounting hardware associated with a rear door of the vehicle 320. In this regard, once the rear door of the vehicle 320 is removed from the hinge knuckles 410, the second air deflector assembly 110 can be mounted onto the rear hinge knuckles 410. In examples, rear hinge pins 430 (FIG. 4) can be slidably inserted relative to the hinge knuckles 410 and eyelets 432 (FIG. 9) provided on the first and second hinge interface members 116 and 118. The second mounting bracket 174 is further secured to the frame 312.

Once the second air deflector assembly 110 is installed, a vehicle operator can rotate the second air deflector assembly 110 generally between a closed position (FIGS. 1-3) and a rotated or fully open position (FIGS. 4-6). It is appreciated that the second air deflector assembly 110 can be rotated to multiple positions between the closed and fully open positions to redirect airflow as desired. In the closed position, airflow 450 (FIG. 2) is generally deflected to a third rearward location 452 as compared to operation of the vehicle 320 without doors. When the second air deflector assembly 110 is rotated about rear axis 458 to the fully open position, airflow 460 (FIG. 5) is generally deflected to a fourth rearward location 462. The fourth rearward location 462 is further back into a cabin 366 of the vehicle 320 as compared to the third rearward location 452 when the first air deflector assembly 10 is in the closed position.

The third air deflector assembly 210 will be further described. The mounting stem 216 of the third air deflector assembly 210 can be fixedly coupled relative to a bracket 470 of the mirror assembly 52. Once installed, the third air deflector frame 212 can be pivotally rotated (around axis 220, FIG. 7) by a vehicle occupant between a closed position (FIGS. 1-3) and a rotated or fully open position (FIGS. 4-6). It is appreciated that the third air deflector assembly 210 can be rotated to multiple positions between the closed and fully open positions to redirect airflow as desired. In the closed position, airflow 480 (FIG. 2) is generally deflected to a fifth rearward or outboard location 486 as compared to operation of the vehicle 320 without doors. The fifth rearward location 486 is generally more rearward into the vehicle cabin 366 as compared to an airflow location with the doors removed. When the third air deflector assembly 210 is rotated to a fully open position, airflow 482 (FIG. 2) is deflected to a sixth rearward or outboard location 488. The sixth rearward location can allow airflow to more freely move between the mirror assembly 52 and the vehicle frame 320 near the windshield (a-frame pillar).

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An air deflector assembly set for mounting relative to a vehicle frame at a vehicle door opening and directing airflow relative to a vehicle cabin, the air deflector assembly comprising:
    a first air deflector assembly comprising:
        a first air deflector frame; and
        a first air deflector body supported by the first air deflector frame, the first air deflector body having an air deflecting surface that extends between a forward edge, a rearward edge, a bottom edge and a top edge;
    wherein the first air deflector assembly is pivotally coupled to the vehicle frame relative to front hinge knuckles extending from the vehicle frame at a front door opening and selectively rotatable between a closed position and an open position, wherein the first air deflector frame further includes eyelets that receive front hinge pins, the front hinge pins extending into the knuckles and defining an axis of rotation of the first air deflector between the closed and open positions, wherein in the closed position, airflow is deflected by the first air deflector body to a first rearward location and in the open position, airflow is deflected by the first air deflector body to a second rearward location, the second rearward location being further back into the vehicle cabin compared to the first rearward location.

2. The air deflector assembly set of claim 1, wherein the first air deflector assembly further includes a first support arm that extends between a frame post and a first mounting bracket, the first mounting bracket configured to be fixedly mounted to the frame of the vehicle.

3. The air deflector assembly set of claim 2, wherein the first air deflector body is formed of transparent material.

4. The air deflector assembly set of claim 3, wherein the air deflector body defines a notch at the top edge configured to accommodate a mirror assembly of the vehicle.

5. The air deflector assembly set of claim 1, wherein the first air deflector frame further comprises a forward frame member, a rearward frame member, a bottom frame member and a top frame member, wherein the rearward frame member is stepped away from the rearward edge of the first air deflector body toward the forward frame member.

6. The air deflector assembly set of claim 2, further comprising:

a second air deflector assembly mounted relative to rear hinge knuckles extending from the vehicle frame, the second air deflector assembly comprising:

a second air deflector frame; and a second air deflector body supported by the second air deflector frame, the second air deflector body having an air deflecting surface that extends between a forward edge, a rearward edge, a bottom edge and a top edge;

wherein the second air deflector assembly is pivotally coupled to the vehicle frame and selectively rotatable between a closed position and an open position, wherein in the closed position, airflow is deflected by the second air deflector body to a third rearward location and in the open position, airflow is deflected by the second air deflector body to a fourth rearward location, the fourth rearward location being further back into vehicle cabin compared to the third rearward location.

7. The air deflector assembly set of claim 6, wherein the second air deflector frame further includes eyelets that receive rear hinge pins, the rear hinge pins extending into the rear hinge knuckles and defining an axis of rotation of the second air deflector between the closed and open positions.

8. The air deflector assembly set of claim 7, wherein the second air deflector assembly further includes a second support arm that extends between a frame post and a second mounting bracket, the second mounting bracket configured to be fixedly mounted to the frame of the vehicle.

9. The air deflector assembly set of claim 6, wherein the second air deflector body is formed of transparent material.

10. The air deflector assembly set of claim 6, wherein the second air deflector frame further comprises a forward frame member, a rearward frame member, a bottom frame member and a top frame member, wherein the rearward frame member is stepped away from the rearward edge of the second air deflector body toward the forward frame member.

11. The air deflector assembly set of claim 6, further comprising:

a third air deflector assembly configured for mounting relative to a mirror assembly of the vehicle, the third air deflector assembly comprising:

a third air deflector frame;

a hinge post that defines an axis substantially parallel to a floor of the vehicle, wherein the third air deflector frame is mounted for pivotal movement around the axis;

a third air deflector body supported by the third air deflector frame, the third deflector body rotatable with the third air deflector frame between a closed position and an open position.

12. The air deflector assembly set of claim 11, wherein in the closed position, airflow is deflected by the third air deflector body to a fifth rearward location and in the open position, airflow is deflected by the third air deflector body to a sixth rearward location, the sixth rearward location allowing airflow to move between the mirror assembly and frame of the vehicle.

13. The air deflector assembly of claim 11, wherein the third air deflector body is formed of transparent material.

14. An air deflector assembly set for mounting relative to a vehicle frame at a vehicle door opening and directing airflow relative to a vehicle cabin, the air deflector assembly comprising:

a first air deflector assembly mounted relative to front hinge knuckles extending from the vehicle frame, the first air deflector assembly comprising:

a first air deflector frame; and a first air deflector body supported by the first air deflector frame, the first air deflector body having an air deflecting surface that extends between a forward edge, a rearward edge, a bottom edge and a top edge;

wherein the first air deflector assembly is pivotally coupled to the vehicle frame at a front door opening and selectively rotatable between a closed position and an open position, wherein in the closed position, airflow is deflected by the first air deflector body to a first rearward location and in the open position, airflow is deflected by the first air deflector body to a second rearward location, the second rearward location being further back into the vehicle cabin compared to the first rearward location; and a second air deflector assembly mounted relative to rear hinge knuckles extending from the vehicle frame, the second air deflector assembly comprising:

a second air deflector frame; and a second air deflector body supported by the second air deflector frame, the second air deflector body having an air deflecting surface that extends between a forward edge, a rearward edge, a bottom edge and a top edge;

wherein the second air deflector assembly is pivotally coupled to the vehicle frame and selectively rotatable between a closed position and an open position, wherein in the closed position, airflow is deflected by the second air deflector body to a third rearward location and in the open position, airflow is deflected by the second air deflector body to a fourth rearward location, the fourth rearward location being further back into vehicle cabin compared to the third rearward location.

15. An air deflector assembly set for mounting relative to a vehicle frame at a vehicle door opening and directing airflow relative to a vehicle cabin, the air deflector assembly comprising:

a first air deflector assembly comprising:

a first air deflector frame; and a first air deflector body supported by the first air deflector frame, the first air deflector body having an air deflecting surface that extends between a forward edge, a rearward edge, a bottom edge and a top edge, wherein the first air deflector frame further comprises a forward frame member, a rearward frame member, a bottom frame member and a top frame member, wherein the rearward frame member is stepped away from the rearward edge of the first air deflector body toward the forward frame member;

wherein the first air deflector assembly is pivotally coupled to the vehicle frame and selectively rotatable between a closed position and an open position, wherein in the closed position, airflow is deflected by the first air deflector body to a first rearward location and in the open position, airflow is deflected by the first air deflector body to a second rearward location, the second rearward location being further back into the vehicle cabin compared to the first rearward location.

16. The air deflector assembly set of claim 15, wherein the first air deflector assembly further includes a first support arm that extends between a frame post and a first mounting bracket, the first mounting bracket configured to be fixedly mounted to the frame of the vehicle.

17. The air deflector assembly set of claim 15, wherein the first air deflector body is formed of transparent material.

18. The air deflector assembly set of claim 17, wherein the air deflector body defines a notch at the top edge configured to accommodate a mirror assembly of the vehicle.

\* \* \* \* \*